(12) United States Patent
Yamada

(10) Patent No.: US 7,925,997 B2
(45) Date of Patent: Apr. 12, 2011

(54) INFORMATION PROCESSING APPARATUS, METHOD AND PROGRAM

(75) Inventor: Tetsuya Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 11/333,218

(22) Filed: Jan. 18, 2006

(65) Prior Publication Data

US 2006/0179169 A1 Aug. 10, 2006

(30) Foreign Application Priority Data

Feb. 9, 2005 (JP) ................................. 2005-033484
Jan. 6, 2006 (JP) ................................. 2006-001734

(51) Int. Cl.
*G06F 3/00* (2006.01)
*G06F 15/177* (2006.01)

(52) U.S. Cl. ........................... 715/866; 709/222; 710/10

(58) Field of Classification Search ...................... 710/10; 709/222; 715/866
See application file for complete search history.

(56) References Cited

U.S. PATENT DOCUMENTS

| | | | | |
|---|---|---|---|---|
| 5,598,523 A * | 1/1997 | Fujita | ............................ | 715/840 |
| 6,005,861 A * | 12/1999 | Humpleman | ................. | 370/352 |
| 6,104,430 A * | 8/2000 | Fukuoka | ..................... | 348/231.6 |
| 6,348,956 B1 * | 2/2002 | Tanigawa et al. | ............. | 348/734 |
| 6,426,800 B1 * | 7/2002 | Mizuno et al. | ............... | 358/1.15 |
| 6,434,447 B1 * | 8/2002 | Shteyn | .......................... | 700/245 |
| 6,546,419 B1 * | 4/2003 | Humpleman et al. | ......... | 709/223 |
| 6,941,364 B2 * | 9/2005 | Kim et al. | ..................... | 709/223 |
| 7,006,881 B1 * | 2/2006 | Hoffberg et al. | ................ | 700/83 |
| 7,047,092 B2 * | 5/2006 | Wimsatt | .......................... | 700/83 |
| 7,092,794 B1 * | 8/2006 | Hill et al. | ....................... | 700/276 |
| 7,203,517 B2 * | 4/2007 | Shimoda et al. | ............... | 455/557 |
| 2002/0041390 A1 | 4/2002 | Mizuno et al. | ............... | 358/1.15 |
| 2006/0067654 A1 * | 3/2006 | Herberger et al. | ............ | 386/120 |
| 2007/0100766 A1 * | 5/2007 | Healy et al. | ..................... | 705/59 |

FOREIGN PATENT DOCUMENTS

JP 11-32154 A 2/1999
JP 3545912 B2 7/2004

* cited by examiner

*Primary Examiner* — William L Bashore
*Assistant Examiner* — David Phantana-angkool
(74) *Attorney, Agent, or Firm* — Fitzpatrick, Cella, Harper & Scinto

(57) ABSTRACT

It is possible to provide a user with an operation screen having settings with which the user is familiar, such as an operation screen that has been used in the past for this external input/output device. When a external input/output device is connected to a information processing apparatus, specific information for specifying the device is acquired. Then, from a storage device that associates and stores an operation screen for processing an image that has been handled by the external device and the specific information, a corresponding operation screen is selected based upon the specific information that has been acquired. By displaying the selected operation screen on a touch-sensitive panel display, various setting operations can be performed with regard to an image that has been input from the external input/output device.

7 Claims, 16 Drawing Sheets

INFORMATION PROCESSING APPARATUS, METHOD AND PROGRAM

FIELD OF THE INVENTION

This invention relates to an information processing apparatus, method and program for displaying a GUI (Graphical User Interface) screen used to perform a setting operation for processing an image acquired from external input/output equipment.

BACKGROUND OF THE INVENTION

An information processing apparatus to which external input/output equipment is connected for providing various services in combination with this equipment is known in the art. These types of information processing apparatus include a digital multifunction apparatus having a specific operation screen for manipulation by the user. Some of these types of apparatus can be connected to a digital camera or the like, acquire an image from the connected device and print the image upon subjecting it to image processing in accordance with various setting items displayed on the operation screen.

Further, there are digital copiers, which are one example of an information processing apparatus, to which a video camera, which is one example of external input/output equipment, is connected so that a picture taken by the video camera can be loaded into the apparatus. A known digital copier among these copiers actually displays a control panel similar to that of the video camera on the copier and allows the video camera to be operated in accordance with the content of control to thereby display the picture (e.g., see the specification of Japanese Patent No. 3545912).

Digital cameras connectable to an information processing apparatus of the above-described kind are of wide variety ranging from those of compact type having limiting functionality to those of single-lens reflex type having many functions. Consequently, in a digital multifunction apparatus that is an information processing apparatus, there are instances where the particulars required for a printing service to print the same image differ. For example, there are many cases where the user of a compact-type digital camera wishes to print the image by leaving the detailed print settings up to the machine, and there are many cases where the user of a single-lens reflex digital camera wishes to print the image upon performing detailed settings such as a tonality adjustment.

With a conventional information processing apparatus, however, all users are provided across the board with an operation screen having the same setting items without particularly taking into consideration the type of digital camera connected. For example, to a compact-type digital camera user who wishes to perform operations as simply as possible, many kinds of settings in which the user is not interested are displayed on the display screen of the information processing apparatus, complicated operations are required and the user is forced to perform operations that are very troublesome. On the other hand, if an operation screen that makes possible only simple setting operations is presented to all users uniformly, a problem still remains in that a user who wishes to print a picture taken by a single-lens reflex digital camera will feel that operability is lacking.

SUMMARY OF THE INVENTION

Accordingly, the present invention has been proposed to solve the problems of the prior art and its object is to provide an information processing apparatus, method and program whereby when an image that has been handled by an external input/output device is input and processed, it is possible to provide a user with an operation screen having settings with which the user is familiar, such as an operation screen that has been used in the past for this external input/output device.

According to the present invention, the foregoing object is attained by providing an information processing apparatus for inputting and processing an image that has been handled by an external device, comprising: an acquisition unit, adapted to acquire specific information for specifying the external device; a display unit, adapted to display an operation screen for processing the image; a storage unit, adapted to store an associating information which associates operation screen for processing an input image that has been handled by external device and specific information of the external device; and a selection unit, adapted to select an operation screen with reference to the associating information based upon the specific information acquired by the acquisition unit; wherein the display means displays the operation screen that has been selected by the selection means.

Further, according to the present invention, the foregoing object is attained by providing an information processing method for inputting an image, which has been handled by an external device, to an information processing apparatus and processing the image, comprising: an acquisition step of acquiring specific information for specifying the external device; a selection step of selecting, based upon the specific information that has been acquired at the acquisition step, an operation screen corresponding to this specific information, the operation screen being selected from a storage device that associates and stores an operation screen for processing an input image that has been handled by external device and specific information of the external device; and a display step of displaying the operation screen, which has been selected at the selection step, on a display device.

Further, according to the present invention, the foregoing object is attained by providing a program for causing a computer, which inputs and processes an image that has been handled by an external device, to execute the following procedures: an acquisition procedure for acquiring specific information for specifying the external device; a selection procedure for selecting, based upon the specific information that has been acquired in the acquisition procedure, an operation screen corresponding to this specific information, the operation screen being selected from a storage device that associates and stores an operation screen for processing an input image that has been handled by external device and specific information of the external device; and a display procedure for displaying the operation screen, which has been selected in the selection procedure, on a display device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENTS

First Embodiment

Figure 1:
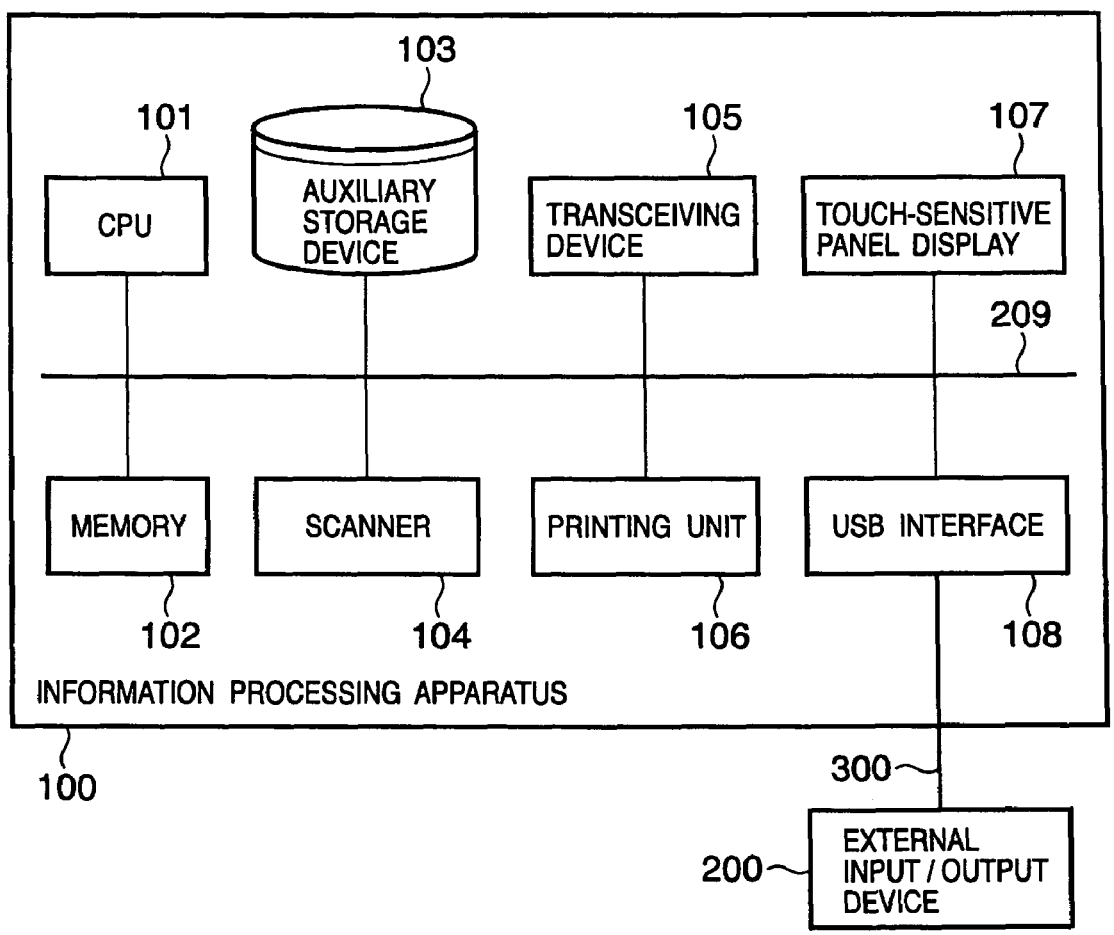
FIG. 1 is a block diagram illustrating the hardware configuration of an information processing system according to an embodiment of the present invention.

FIG. 1 is a block diagram illustrating the hardware configuration of an information processing system according to an embodiment of the present invention. As illustrated in FIG. 1, the information processing system according to this embodiment includes an information processing apparatus 100 and an external input/output device 200 connected via a USB (Universal Serial Bus) cable 300.

As shown in FIG. 1, the information processing apparatus 100 includes a CPU 101, a memory 102, an auxiliary storage device 103, a scanner 104, a transceiving device 105, a printing unit 106, a touch-sensitive panel display 107 and a USB interface 108, these components being connected by an internal bus 109.

The CPU 101 runs a program, which is for executing an information processing method according to an embodiment of the present invention, and exercises various control processing. The memory 102, which comprises a RAM or ROM, is utilized as a storage location for the program and for various data and as a work area for executing the program. The auxiliary storage device 103, which comprises a large-capacity storage device such as a hard disk, is for archiving large quantities of data and for holding the actual codes of the program. The auxiliary storage device 103 generally stores data that requires to be held for a longer period of time in comparison with the memory 102.

The scanner 104 executes processing for optically reading a paper original, the transceiving device 105 sends and receives digital data to and from another apparatus, and the printing unit 106 prints digital data on a paper medium. The touch-sensitive panel display 107 presents the user with information by displaying the information table on a screen. User commands are input to the display 107 via a touch-sensitive panel. The touch-sensitive panel display 107 provides a so-called graphical user interface (also referred to as a GUI or UI). The USB interface 108 is connected via the USB cable 300 to the external input/output device 200, such as a digital camera, that is compliant with USB specifications.

Figure 5:
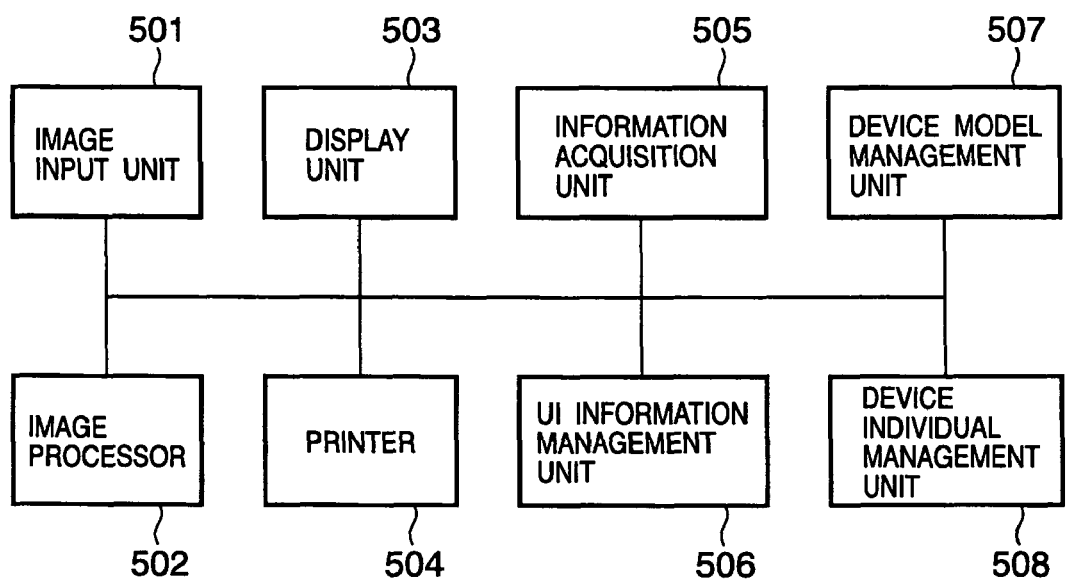
FIG. 5 is a block diagram illustrating an arrangement that makes it possible to execute various processing in the information processing apparatus of this embodiment equipped with the hardware configuration shown in FIG. 1.

FIG. 5 is a functional block diagram illustrating an arrangement that makes it possible to execute various processing in the information processing apparatus 100 of this embodiment equipped with the hardware configuration shown in FIG. 1. The functional block diagram of FIG. 5 can be implemented using the hardware configuration shown in FIG. 1.

An image input unit 501 inputs an image of a picture that has been taken by the external input/output device 200. An image processor 502 subjects the input image that has been input from the image input unit 501 to various image processing in response to a command from the operation screen displayed on the display unit 503. The display unit 503, which displays an operation screen for processing the image that has been input from the image input unit 501, presents this operation screen on the touch-sensitive panel display 107. A printer 504 prints out the image based upon the image data that has undergone image processing in the image processor 502.

An information acquisition unit 505 acquires model information and individual information from the external input/output device 200 and delivers this information to device model management unit 507 and device individual management unit 508 that handle these items of information. The model information is information that is unique for every model of digital camera, by way of example, and corresponds to, e.g., model name. On the other hand, the individual information is unique information for every individual even of the same model. For example, this corresponds to a serial number assigned to the product at the time of production.

Figure 16:
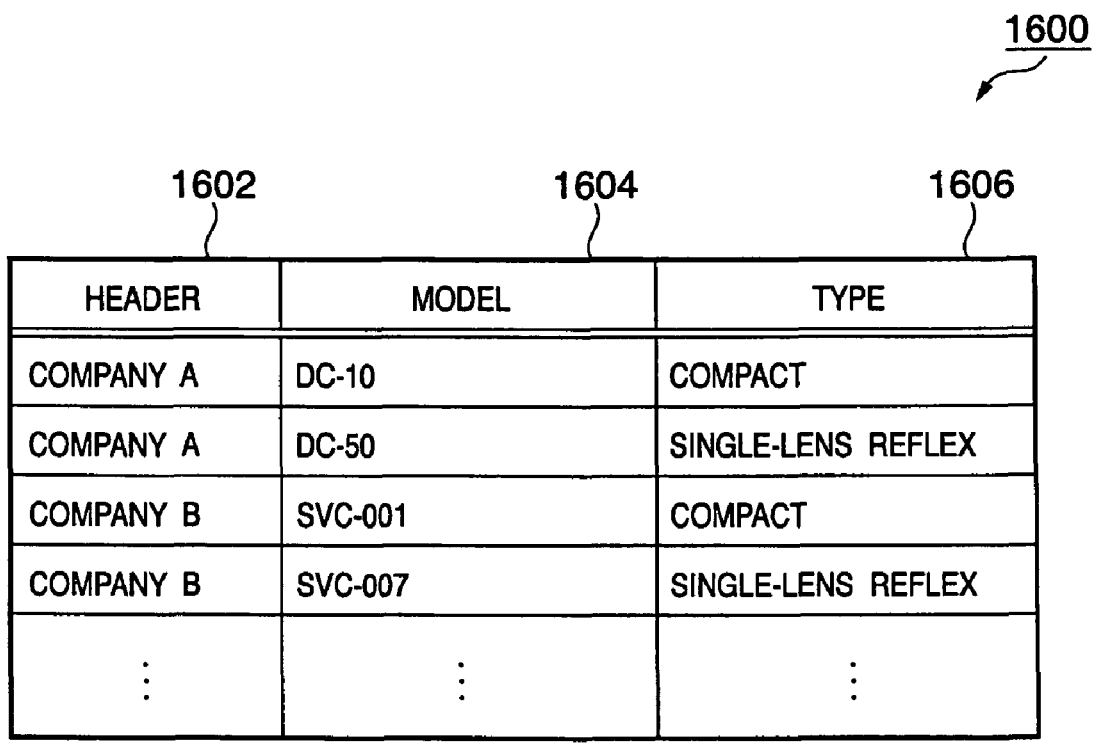
FIG. 16 is a diagram illustrating a table of model information relating to external input/output devices.

The device model management unit 507 keeps the model information of an external input/output device and information, which identifies whether the model is a compact device or a single-lens reflex device (or a power-user-suited device similar thereto), in a model information table 1600 shown in FIG. 16.

The model information table 1600 of FIG. 16 has a header 1602, model 1604 and type 1606 as its items. If reference is made to the model information table based upon the model information acquired by the information acquisition unit, whether the model is compact or single-lens reflex can be ascertained.

The device individual management unit 508 manages the model information/individual information acquired and performs management using an internally provided individual-information management table 600 of the kind illustrated in FIG. 6, the details of which will be described later.

Figure 6:
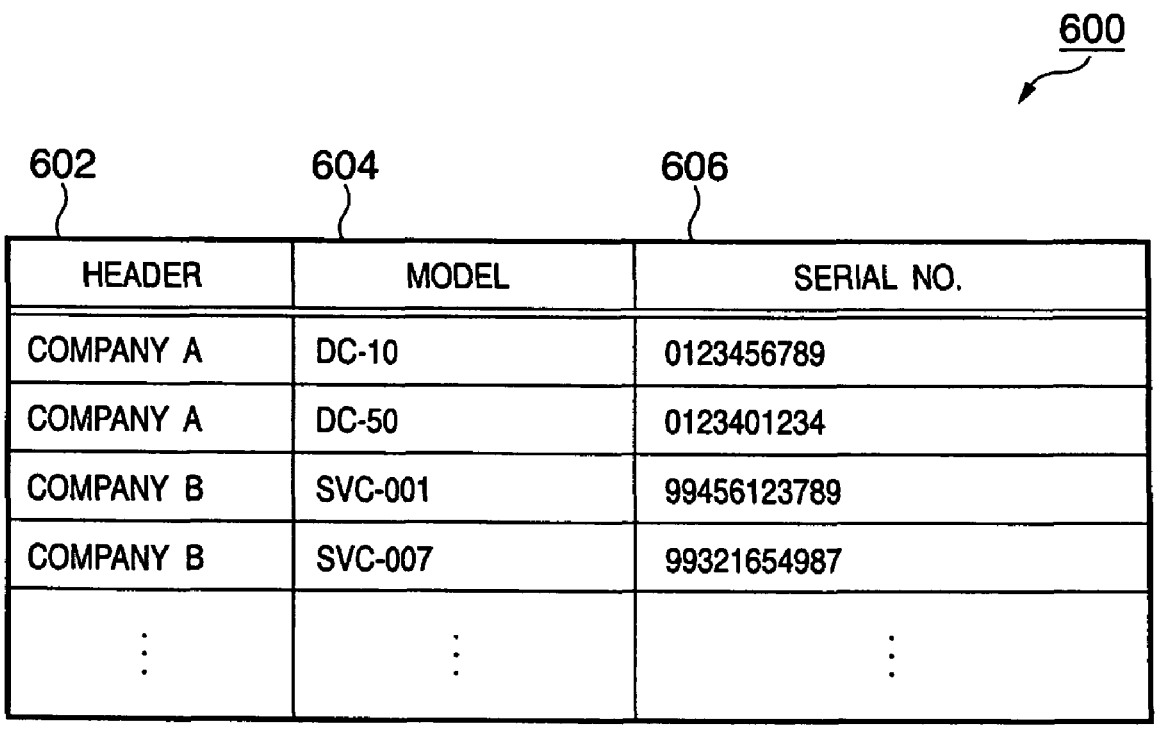
FIG. 6 is an individual-information management table representing the correspondence between the individual information and operation screen of external input/output devices.

The individual-information management table 600 shown in FIG. 6 has a header 602, model 604 and serial number 606 as its items.

In order to process the image captured by the external input/output device 200, a UI (User Interface) information management unit 506 manages the correspondence between the operation screen displayed on the display unit 503 and the specific information of the device.

Figure 7:
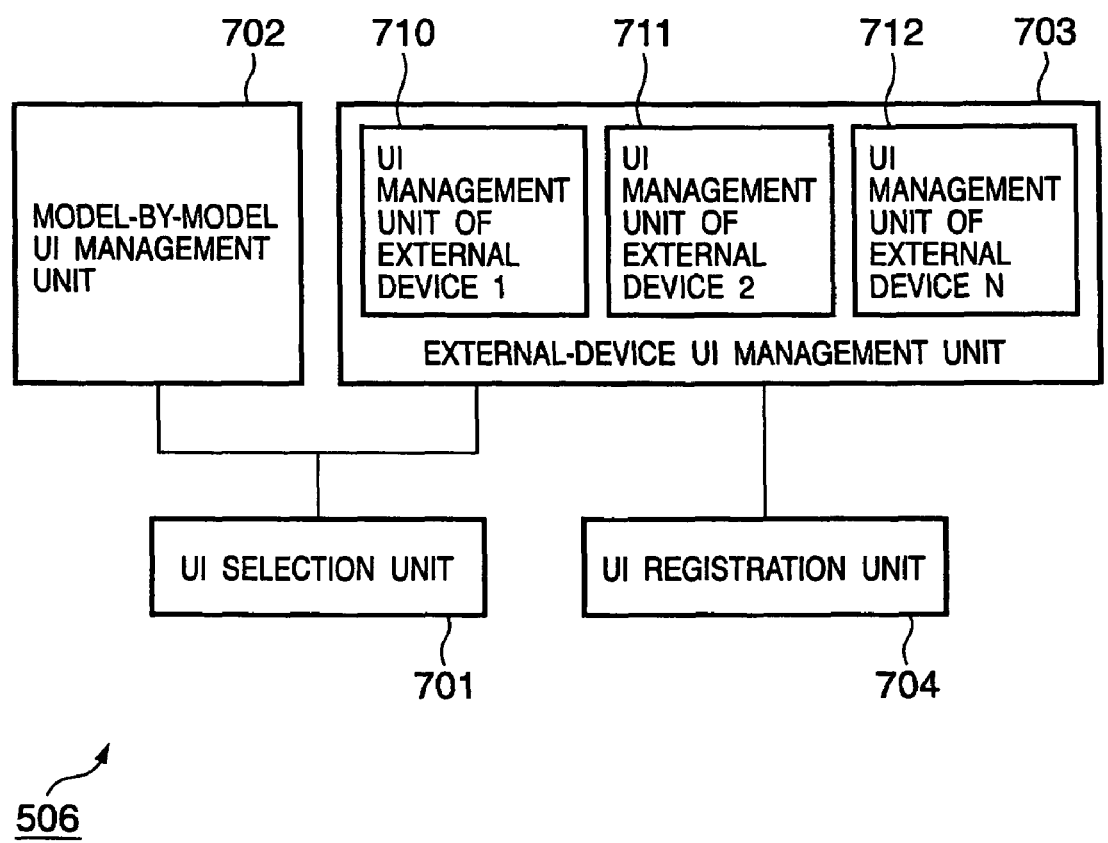
FIG. 7 is a block diagram illustrating the structure of a UI information management unit.

The UI information management unit 506 has the structure shown in FIG. 7. A UI selection unit 701 selects a model-by-model UI management unit 702 or external-device UI management unit 703 in order to select the appropriate UI. The model-by-model UI management unit 702 manages a default UI, etc., described later, which is optimum information for every model of external input/output unit. The external-device UI management unit 703 manages the GUI (e.g., whether the GUI of FIG. 3 or the GUI of FIG. 4) used in external input/output units 710, 711, . . . 712 utilized in the past. A UI registration unit 704 registers the GUI that has been used by the presently connected external input/output device.

An example of processing using the information processing apparatus 100 according to this embodiment shown in FIGS. 1 and 5 will now be described in detail.

Figure 2:
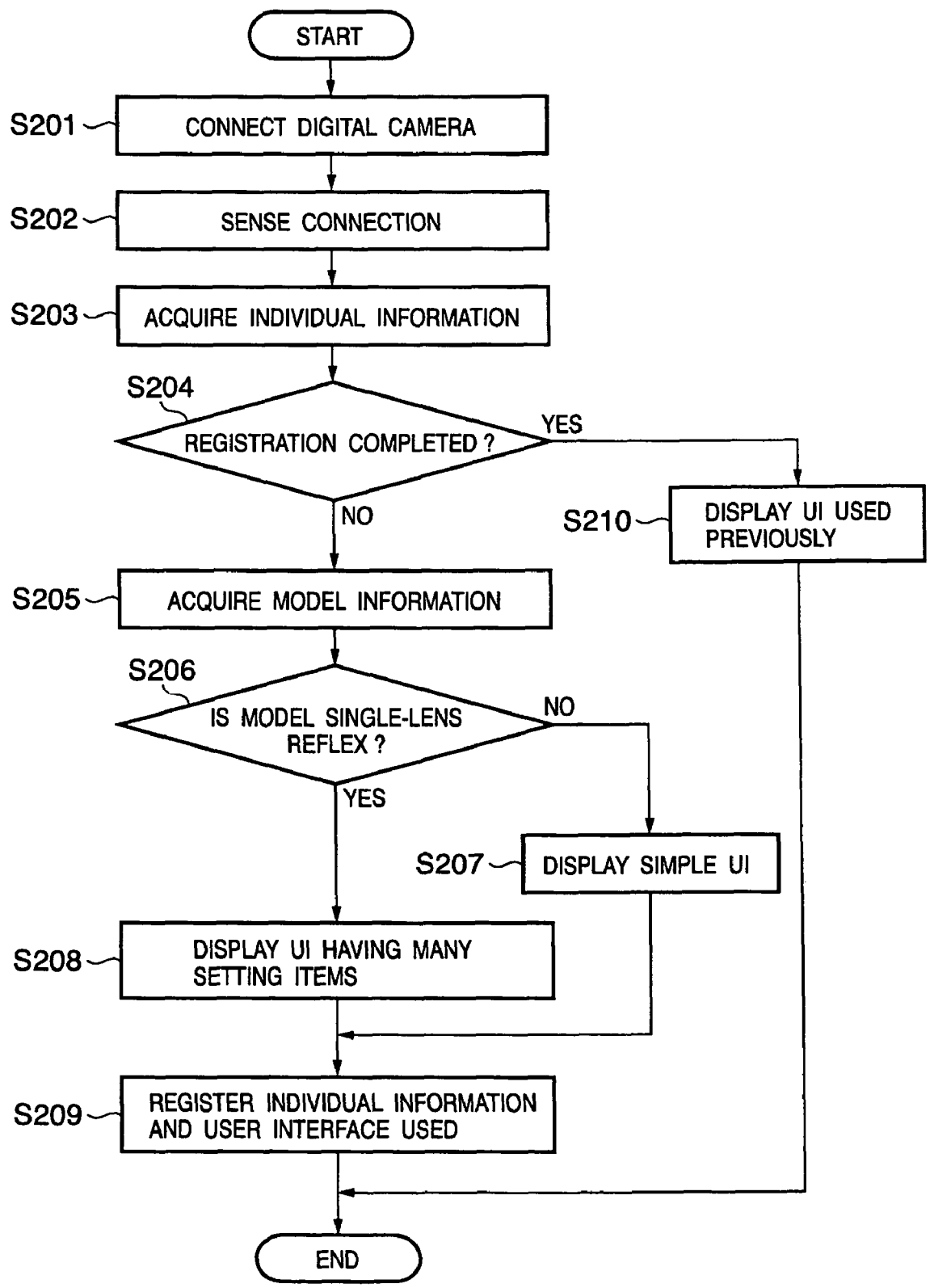
FIG. 2 is a flowchart for describing processing for selecting a GUI screen implemented in an information processing apparatus according to the embodiment.

FIG. 2 is a flowchart for describing processing for selecting a GUI screen implemented in an information processing apparatus according to the embodiment. The processing indicated by this flowchart is executed by the CPU 101 of the information processing apparatus 100. Processing for a case where the information processing apparatus 100 of this embodiment has been connected to a digital camera serving as the external input/output device 200 will be described in accordance with the flowchart shown in FIG. 2.

First, a digital camera holding a photographic image to be processed by the information processing apparatus 100 is connected to the USB interface 108 of the information processing apparatus via the USB cable 300 (step S201). The information acquisition unit 505 in the information processing apparatus 100 senses that the digital camera has been connected (step S202). When the information acquisition unit 505 senses that the digital camera has been connected and acquires a descriptor decided by USB standards, it specifies the model by querying the device-type management unit for the vendor ID (idVendor; two bytes)) and product ID (idProduct; two bytes) contained in the descriptor, and acquires the serial number (iSerial Number) as information specifying the digital camera and delivers this to the device individual management unit 508 (step S203).

Next, the UI selection unit 701 conducts a search to determine whether the digital camera having the individual information acquired from the external-device UI management unit 703 has heretofore been connected to this information processing apparatus 100 and utilized by it (step S204). If the result of the search is that the digital camera has been used in the past and been registered in the information processing apparatus 100 ("YES" at step S204), then the information processing apparatus 100 selects the GUI screen that is capable of implementing the various settings used previously (i.e., already registered) to process images.

On the other hand, if it is determined at step S204 that the digital camera has not been used and registered in the past ("NO" at step S204), then the information processing apparatus 100 acquires the image data from the connected digital camera and acquires the model information from maker and model items of a tag in, e.g., the Exif (Exchangeable image file) format (step S205). The apparatus then discriminates the model and type of the connected digital camera based upon the model information acquired by referring to the table of FIG. 16 managed by the device model management unit 507 (step S206). The discrimination operation is performed by referring to the model information table 1600 of FIG. 16.

Figure 3:
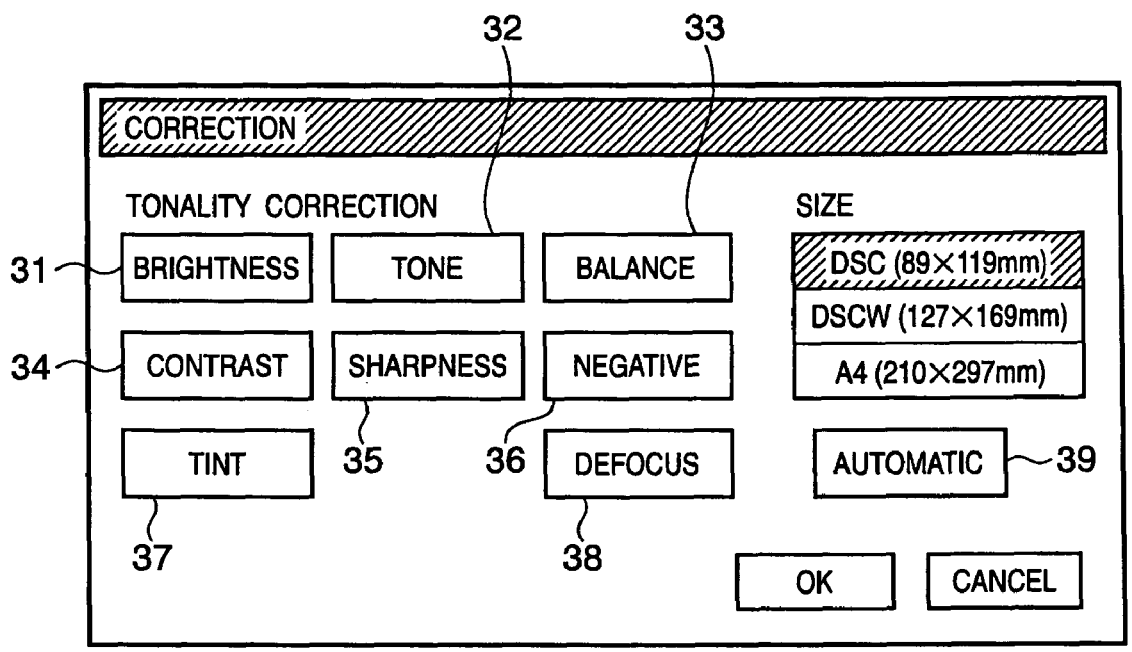
FIG. 3 is a diagram illustrating an example of a GUI screen that makes possible the setting of various items.

If the result of the determination is that the connected digital camera is a single-lens reflex camera ("YES" at step S206), then the apparatus displays a GUI screen having many setting items as exemplified in FIG. 3. The GUI screen shown in FIG. 3 is displayed on the touch-sensitive panel display 107. Various settings such as for tonality processing can be executed by pressing (touching) displayed buttons (e.g., a "BRIGHTNESS" button 31 to a "DEFOCUS" button 38) for executing tonality processing desired by the user. These items of information are managed by the model-by-model UI management unit 702 and the UI selection unit 701 makes the selection.

Figure 4:
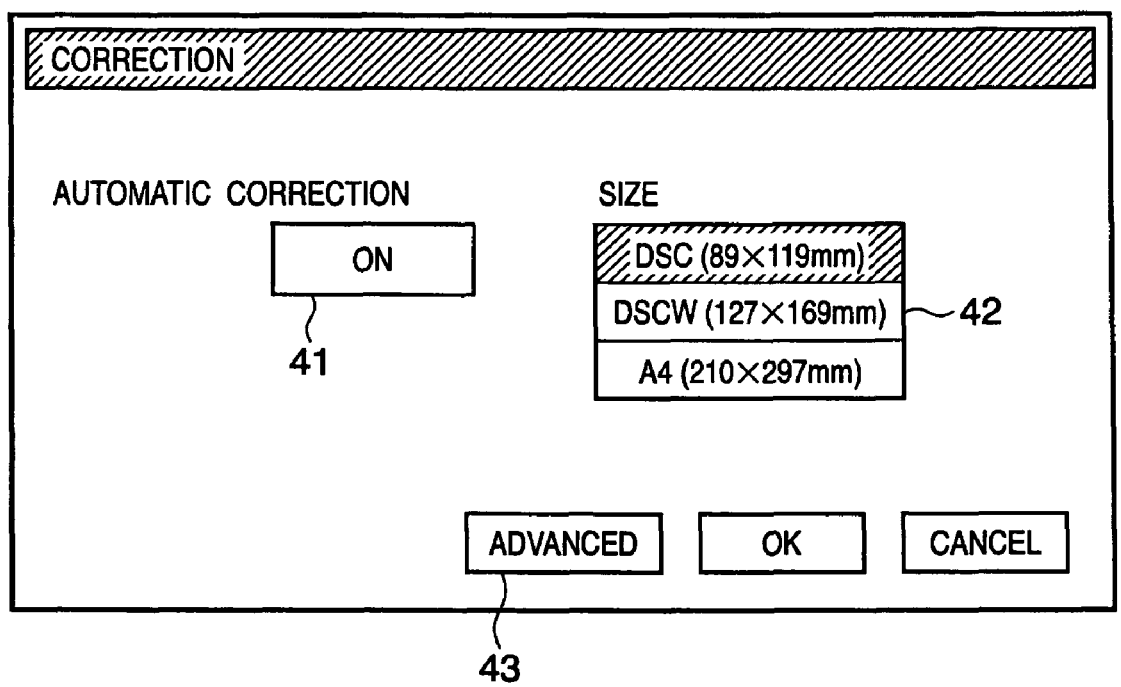
FIG. 4 is a diagram illustrating an example of a GUI screen for executing correction processing automatically.

Further, the user can transition to a comparatively simple GUI screen shown in FIG. 4 by pressing (touching) an "AUTOMATIC" button on the GUI screen shown in FIG. 3. FIG. 4 is a diagram illustrating an example of a GUI screen for executing correction processing automatically.

If the result of the determination at step S206 is that the connected digital camera is a compact-type camera and not a single-lens reflex camera ("NO" at step S206), then the GUI screen exemplified in FIG. 4 is displayed instead of the GUI screen illustrated in FIG. 3 (step S208). The screen shown in FIG. 4 displays only an "AUTOMATIC CORRECTION" button 41, which selects whether the tonality correction is to be performed automatically, and a combo box 42 for selecting size when an image is printing out. It should be noted that by pressing an "ADVANCED" button 43, the user can transition to the GUI screen of FIG. 3 that makes detailed settings possible.

After the simple GUI screen or the GUI screen having many setting items is selected (step S207 or S208) and the GUI screen to be employed by the user is finally decided in the manner described above, the UI registration unit 704 of the UI information management unit 506 executes processing to register (store) the combination composed of the individual information pertaining to the digital camera and the displayed GUI screen (step S209). It should be noted that the information registered at step S209 is utilized in the decision at step S204 the next time an external input/output device is connected.

Although the GUI screen is selected upon determining at step S206 whether the model is single-lens reflex based upon the model information, another method may be used. That is, the model-by-model UI management unit 702 may be provided beforehand with a table that correlates with either a simple UI or UI with many setting items, for every model of external input/output device. Which UI is to be displayed is decided directly from the model information acquired at step S206.

By virtue of the above-described processing, it is possible to provide more user-friendly service. That is, the operation screen that corresponds to the external device that has been stored in the information processing apparatus 100 can be provided to the user preferentially, and if the device has not been registered, then an operation screen that is more in line with the volition of the user can be provided.

More specifically, by utilizing the individual information and device model information, etc., acquired from the external input/output device 200 such as a digital camera connected to the apparatus, it is possible to decide and select the content of the GUI screen for processing the image acquired from the external input/output device 200. As a result, for the user of a compact-type digital camera, for example, it is possible to display a GUI screen the same as that used when processing was performed by the user in the past employing this device, or a GUI screen that enables the image to be printed more easily. For the user of a single-lens reflex digital camera it is possible to display a GUI screen the same as that used when processing was performed by the user in the past employing this device, or a GUI screen having many setting items that enable more advanced settings such as a setting for tonality processing. Thus, in accordance with the information processing apparatus 100 according to this embodiment, a GUI screen for processing that conforms to the type of external input/output device 200 connected can be displayed in ideal fashion and operability for each individual user can be enhanced.

It should be noted that the printing unit 106 shown in FIG. 1 need not necessarily be provided in the information processing apparatus 100, and it may be so arranged that print processing is performed using another device connected over a network such as a LAN. Further, according to this embodiment, the connection between the information processing apparatus 100 and the external input/output device 200 is implemented using the USB cable 300, and the information processing apparatus 100 is equipped with the USB interface 108 for this purpose. However, it may be so arranged that the connection is made via a network such as a LAN and the information processing apparatus equipped with a network interface for this purpose. Alternatively, it may be so arranged that the image that has been acquired by the external input/output device 200 is recorded on a removable recording medium and the information processing apparatus equipped with a reading device for reading this recording medium. Furthermore, the information processing apparatus may be one not equipped with the scanner 104 or transceiving device 105 or one that is connectable to an external scanner.

Moreover, the display function and input function described above may be implemented using a general-purpose CRT display or liquid crystal display and an input unit such as a keyboard rather than a touch-sensitive panel display. The information processing apparatus set forth above can be implemented using a digital multifunction peripheral, a digital copier or a personal computer and a device such as a printer connected thereto.

Second Embodiment

In the first embodiment, an example in which the information processing apparatus 100 and external device are connected by a USB cable is described. Described in this embodiment will be an example in which two interfaces for performing individual identification/authentication by a non-contact IC card and data communication by a wireless LAN are combined and connected.

Figure 8:
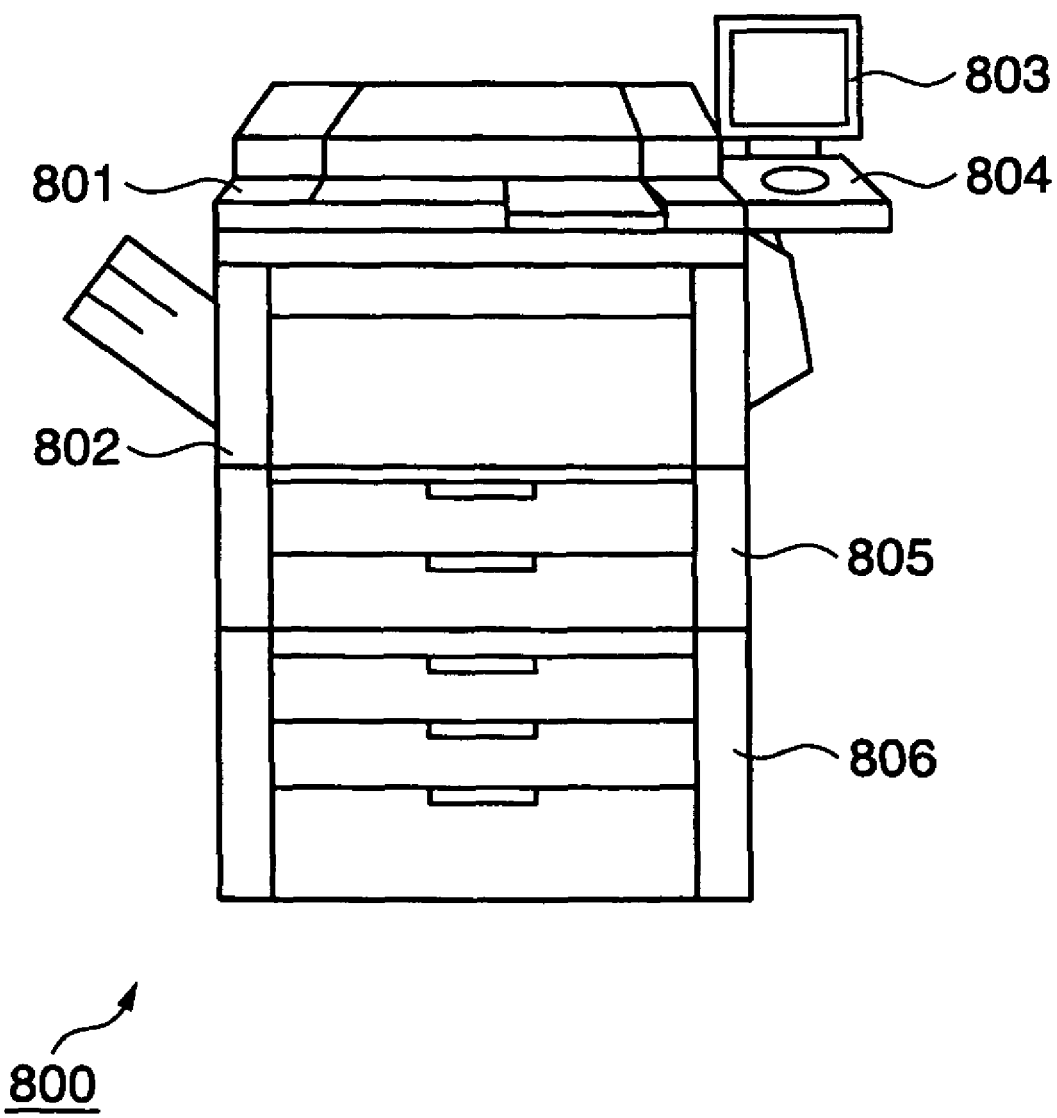
FIG. 8 is an external view of a copier equipped with a device port.

An information processing apparatus 800 according to this embodiment is a digital multi-function peripheral equipped with an external input/output interface referred to as a "device port" that handles a plurality of external-device connection interfaces in unified fashion. FIG. 8 is an external view of the information processing apparatus 800.

A scanner 801 reads the image of a paper original optically and generates image data. The information processing apparatus 800 forms an image on paper that has been fed from a normal feeder 805 or large-capacity feeder 806 and ejects the paper into a paper-drop tray 802. A control panel 802, which comprises a touch-sensitive panel or the like, is manipulated by the user of the information processing apparatus 800 and presents various information to the user. A device port 804 is equipped with interfaces for USB, a non-contact IC card reader/writer and a wireless LAN.

Figure 9:
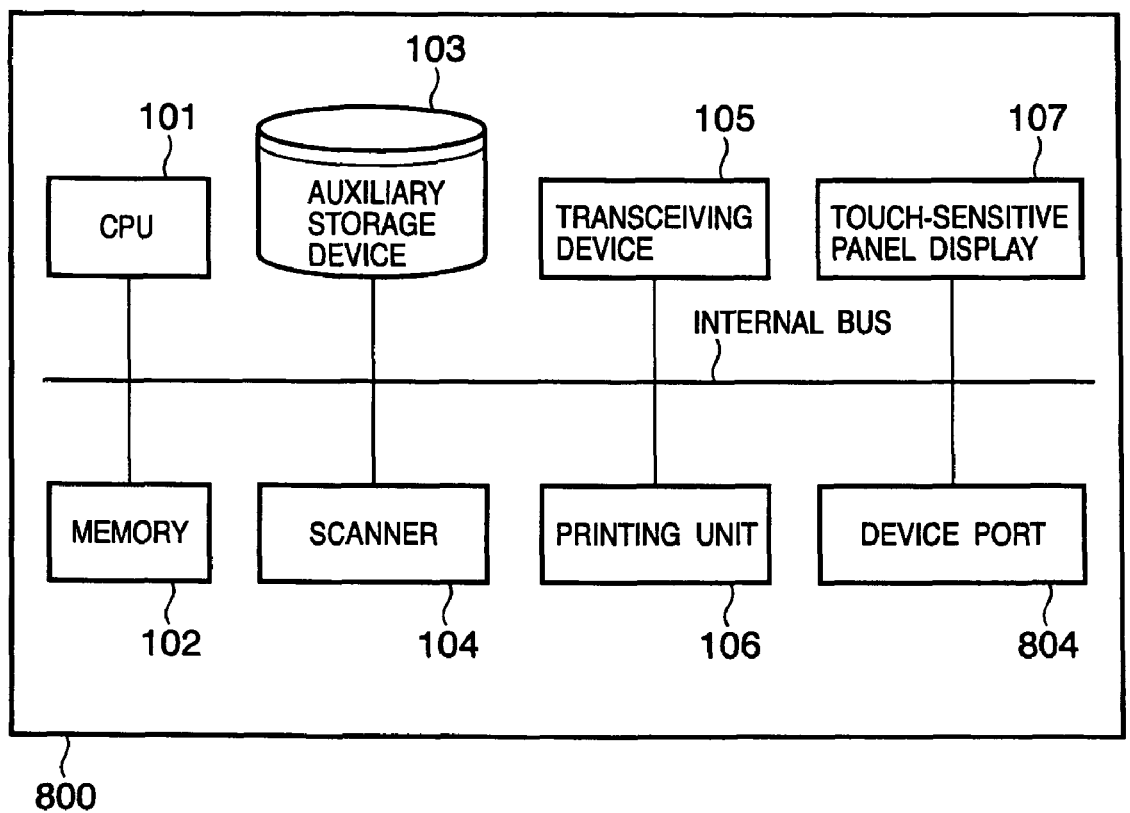
FIG. 9 is a diagram illustrating the hardware configuration of an information processing apparatus equipped with a device port.

FIG. 9 is a diagram illustrating the hardware configuration of a copier according to this embodiment. The configuration is similar to that of the FIG. 1 with the exception of the USB interface 108 in FIG. 1 and similar components are designated by like reference characters.

The device port 804 is connected to an internal bus and has three interfaces in order to communicate with external input/output devices.

Figure 10:
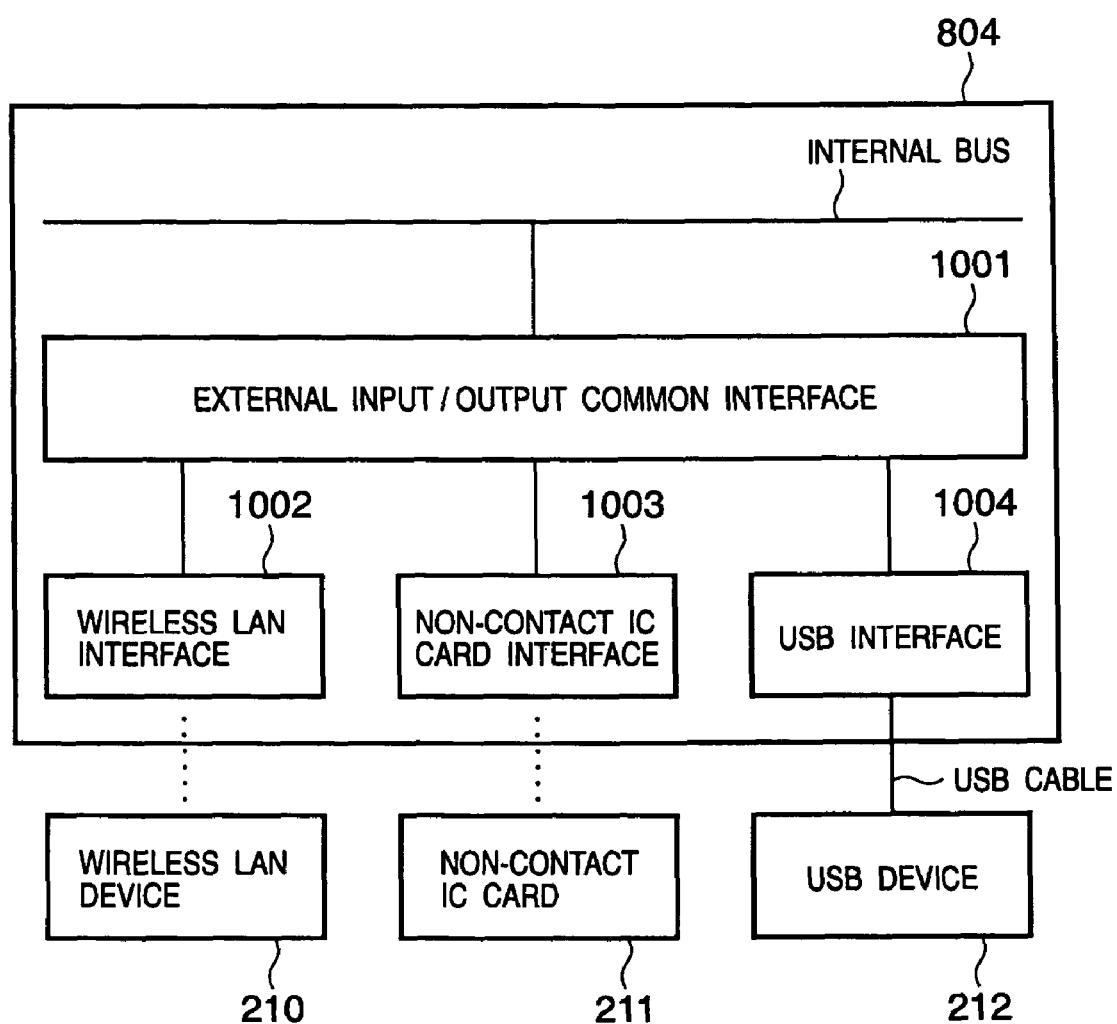
FIG. 10 is a diagram illustrating the hardware configuration of a device port.

FIG. 10 illustrates the hardware configuration of the device port 804 in greater detail.

An external input/output common interface 1001 coordinates the three interfaces.

A wireless LAN interface 1002 is an interface for connection to a wireless LAN. By way of example, this interface supports any system compliant with IEEE 802.11a, b, g or n, etc., or all of these simultaneously.

A non-contact IC card interface 1003 is an interface for communication with a non-contact IC card. A FeliCa (registered trademark) scheme is used for the non-contact IC card. FeliCa is one technological scheme used for non-contact IC cards. The non-contact IC card has an antenna and an IC chip, etc., and the reader/writer is equipped with an antenna and control board. Communication between the reader/writer and card is carried out by electromagnetic waves transmitted from the reader/writer. Communication utilizes a 13.56-MHz frequency band and is performed at a speed of 212 kbps. The communication distance is up to 10 cm.

A non-contact IC card using the FeliCa scheme is capable of managing multi-purpose data in a single card. Further, since it is possible to set individual access privilege for each item of data, secure operation between applications is implemented. The non-contact IC card is also referred to as a "FeliCa device". Since the non-contact IC card interface 1003 makes possible communication with a non-contact IC card, it is also possible to communicate with a device other than a non-contact IC card if the device is equipped with a non-contact IC chip.

A USB interface 1004 is an interface for connection to and communication with an external input/output device using a USB cable in a manner similar to that of the USB interface of FIG. 1. Further, interfaces for the external input/output device of the wireless LAN interface 1002, non-contact IC card interface 1003 and USB interface 1004.

The wireless-LAN connection scheme includes an "infrastructure mode", in which communication is performed via an access point, and an "ad-hoc mode", in which devices communicate with each other directly without the intermediary of an access point. In this embodiment, communication between the device port of the information processing apparatus 800 and an external device is performed using the ad-hoc mode.

In this embodiment, information managed by the device model management unit 507 described later is device type, model information, individual identifier, MAC address and IP address, etc., of the external input/output device connected. For example, the device type is "digital camera", the model information is a 4-byte numerical value that corresponds to the model name of the digital camera, the individual identifier is a serial number, and the MAC address is a MAC address that is specific to the network interface of the external device.

With the connection via the USB interface 1004, a table for converting information described in the descriptor is provided, as set forth in the first embodiment. In the case of a non-contact IC card, a file in which the device information stored in the card has been written is read out and converted via the non-contact IC card interface. In this embodiment, an IC chip equivalent to that provided in a non-contact IC card is incorporated in the external input/output device (digital camera, etc.) at the time of manufacture of the device, and device information other than an IP address is written as a file in the IC chip at the time of shipment from the factory. An IP address decided at the time of wireless-LAN connection is written dynamically at the time of operation after shipment from the factory.

Figure 11:
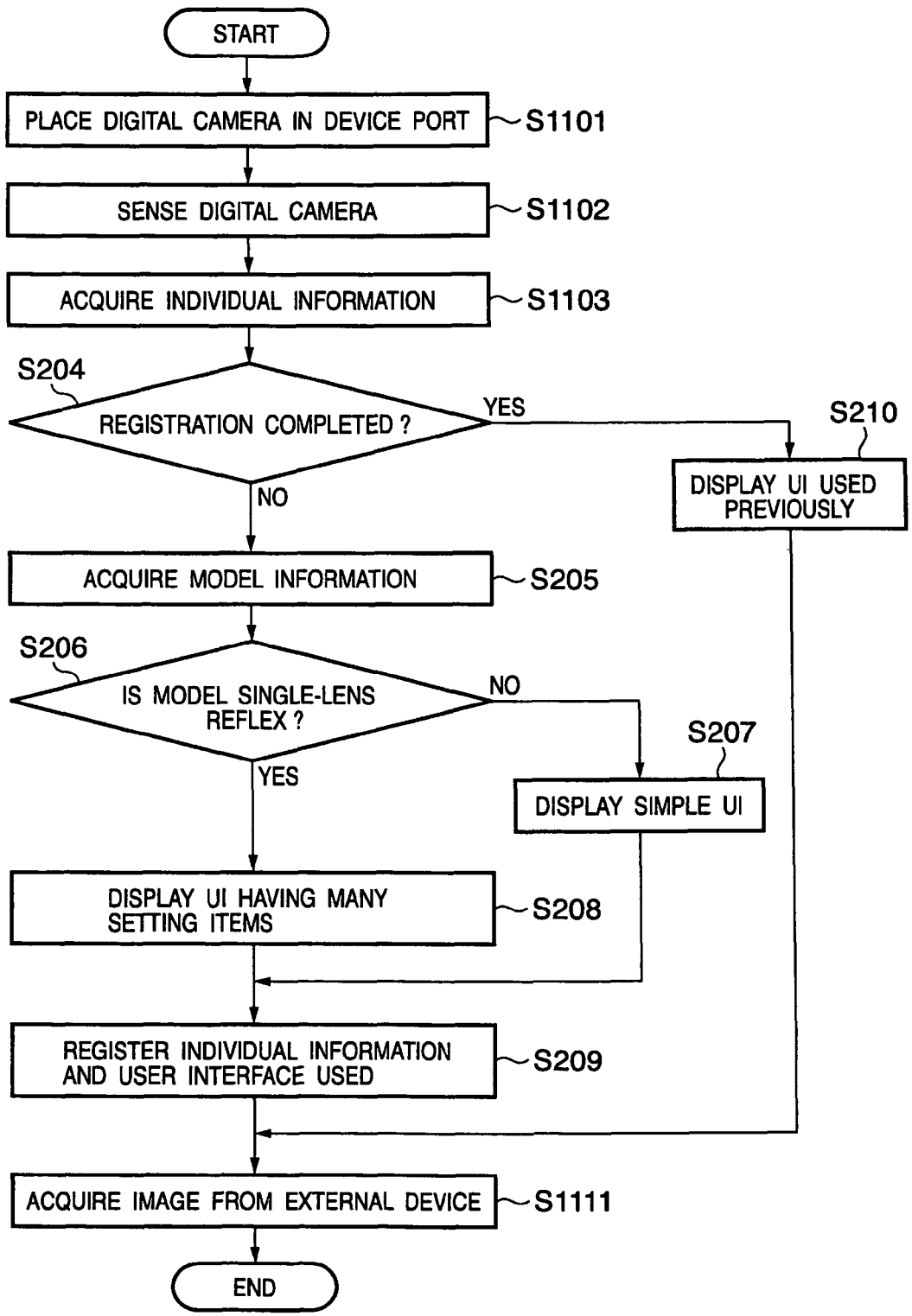
FIG. 11 is a flowchart useful in describing the flow of processing executed in an information processing apparatus according to an embodiment of the invention in a case where a wireless LAN, an external device having a FeliCa (registered trademark) and an image input unit are connected together.

FIG. 11 is a flowchart for describing processing executed by the information processing apparatus 800 for selecting a GUI screen according to this embodiment. The processing indicated by the flowchart of FIG. 11 is executed by the CPU 101 of information processing apparatus 800. The flow of processing up to the connection of a wireless LAN, an external device having a non-contact IC and an image input unit and execution of data communication will be described in accordance with the flowchart shown in FIG. 11. The flowchart of FIG. 11 is obtained by expressing the flowchart of FIG. 2 anew in conformity with the hardware configuration of this embodiment. Steps identical with those in FIG. 2 are designated by like step numbers. Only steps that differ from those of the flowchart of FIG. 2 will be described.

A digital camera is placed in the device port at step S1101. When this is done, the non-contact IC incorporated in the digital camera is situated within a distance over which it can communicate with the non-contact IC card interface 1003 of the device port. At step S1102, the information acquisition unit 505 senses that the device is a digital camera by utilizing the non-contact IC card interface 1003. The connection to the sensed digital camera by the wireless LAN is then started. Next, at step S1103, the device information is read out via the non-contact IC card interface, the device information is converted by the device model management unit 507 (FIG. 5) and is managed by the device individual management unit 508. The functions of the device model management unit 507 and device individual management unit 508 are identical with those of the first embodiment. Steps S204 to S210 are similar to the same steps in FIG. 2. The device port 804 acquires an image from the digital camera utilizing the wireless LAN interface 1002 at step S1111.

Thus, implementation is possible also in an arrangement in which an non-contact IC card and wireless LAN are utilized as interfaces with an external device.

In accordance with the second embodiment above, it is possible for an operation screen that conforms to an external input/output device that has been stored in the information processing apparatus 800 to be provided to the user preferentially merely by placing the external input/output device in the device port.

Third Embodiment

Described in the first and second embodiments is an example in which information (model information and individual information) relating to a device is utilized in order to select a GUI. In this embodiment, however, an example in which user information is utilized in addition to the arrangement of the second embodiment will be described. An ID card on which a non-contact IC chip such as FeliCa is mounted is utilized as means for authenticating the user.

Figure 12:
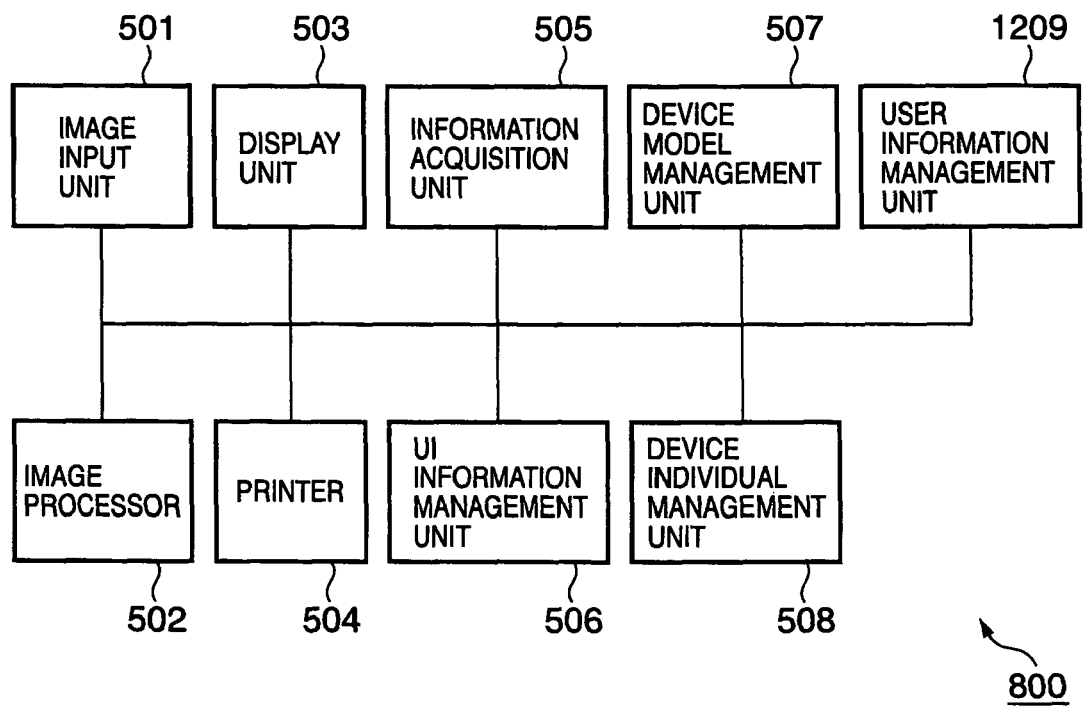
FIG. 12 is a block diagram illustrating an arrangement that makes it possible to execute various processing in an information processing apparatus according to a third embodiment equipped with the hardware configuration shown in FIG. 1.

In order to utilize the user information, the arrangement of FIG. 5 is additionally provided with a user information management unit 1209 to obtain the arrangement shown in FIG. 12.

Figure 13:
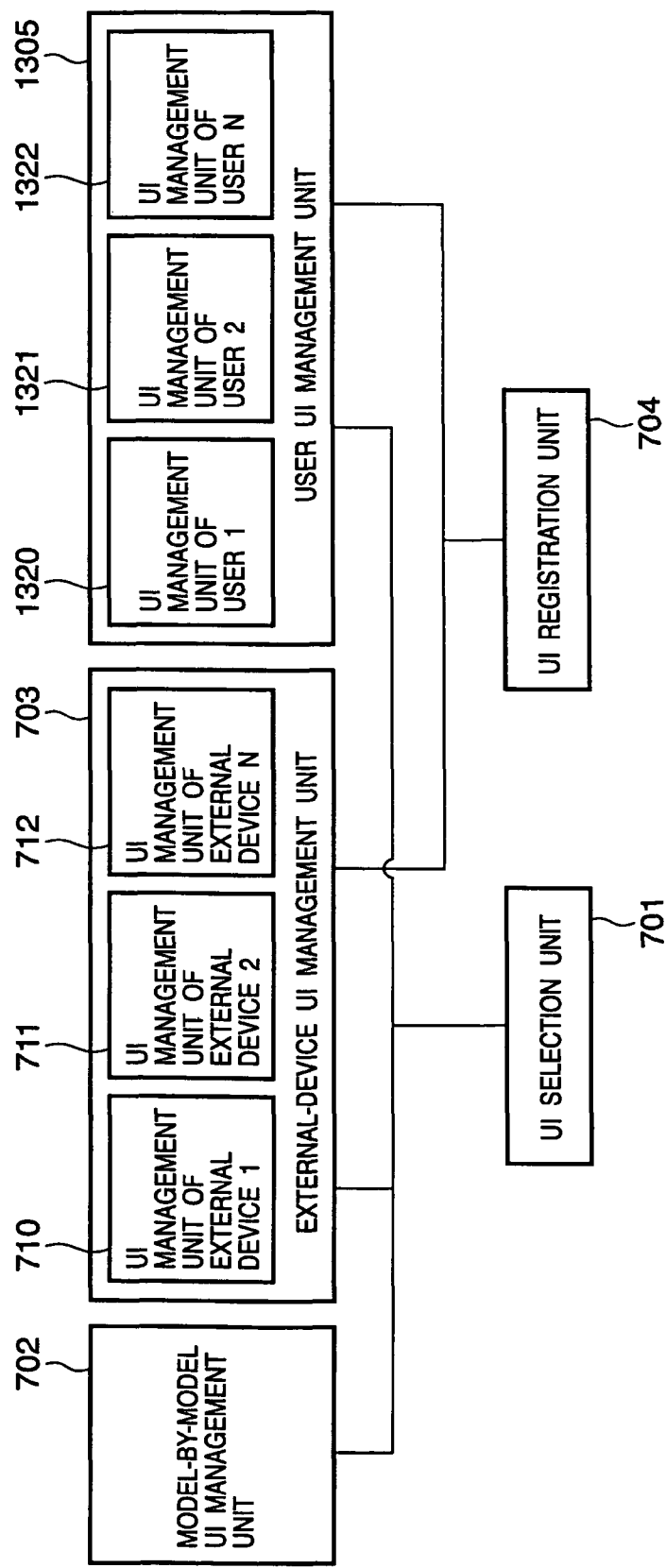
FIG. 13 is a block diagram illustrating the structure of the UI information management unit according to the third embodiment.

Further, as shown in FIG. 13, the UI information management unit 506 has a structure obtained by adding a user UI management unit 1305 to the arrangement of FIG. 7.

Figure 14:
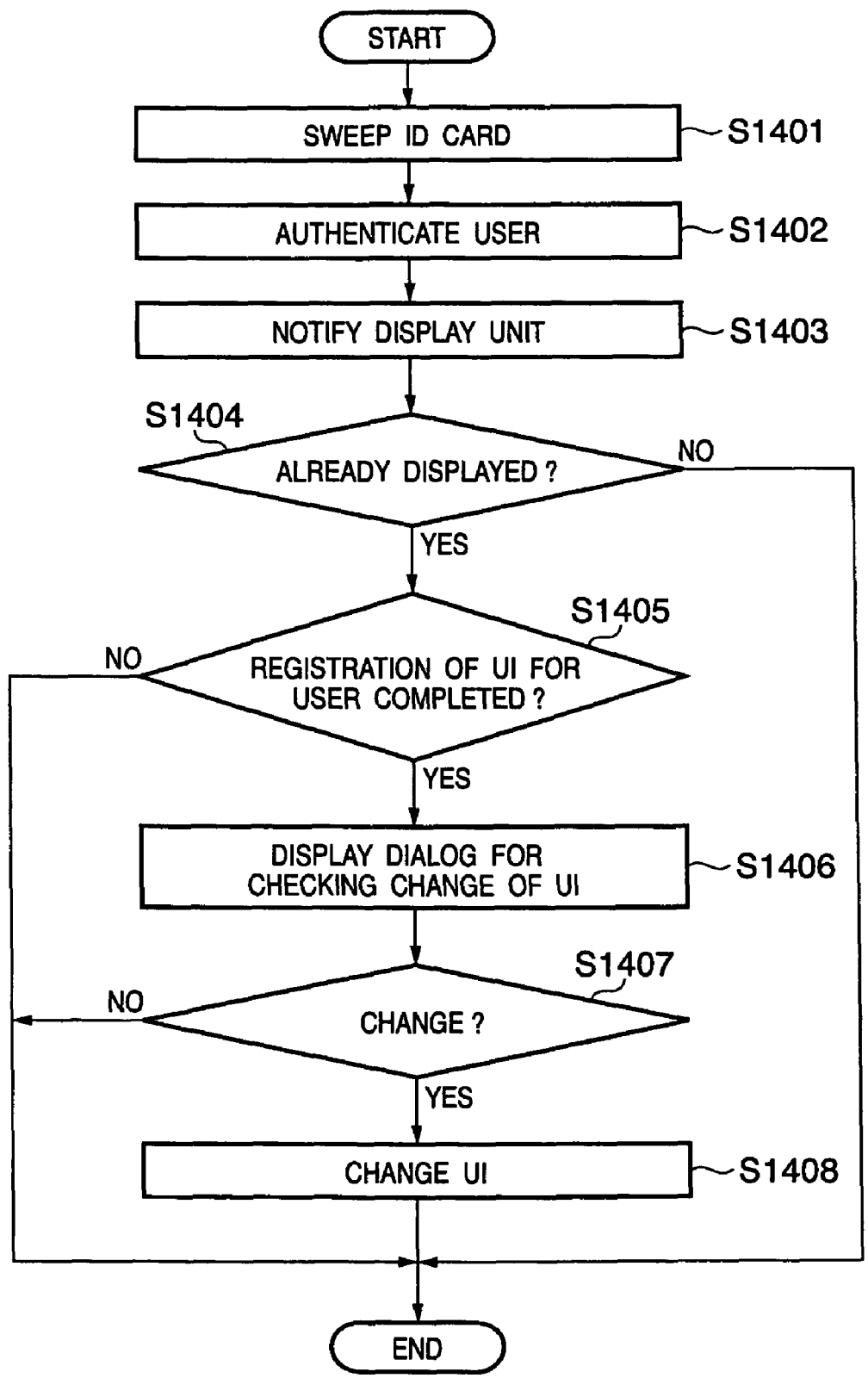
FIG. 14 is a flowchart useful in describing the flow of processing relating to user authentication executed in an information processing apparatus according to an embodiment of the present invention.

FIG. 14 is a flowchart for describing processing up to user authentication and subsequent display of the GUI. The processing indicated by the flowchart shown in FIG. 14 is executed by the CPU 101 of the information processing apparatus 800.

When an ID card is held in the device port at step S1401, the information acquisition unit 505 acquires the user information at step S1402.

User identification/authentication is performed utilizing the user information management unit 1209 based upon the acquired user information and the display unit 503 is notified at step S1403 of the fact that the user has been specified.

It is determined at step S1404 whether there is an external input/output device whose connection to the device port has been completed and whether the UI for this device is being displayed on the display unit 503. If a "YES" decision is rendered at step S1404, control proceeds to step S1405. Here the UI information management-unit 506 determines whether the UI for the above-mentioned device that was utilized by the authenticated user has already been registered in the user UI management unit 1305. If a "NO" decision is rendered at step S1404, then processing is exited. If a "YES" decision is rendered at step S1405, then the display unit 503 displays dialog at step S1406 in order to query the user as to whether the UI is to be changed. If a "NO" decision is rendered at step S1405, then processing is exited. If an input to the effect that the UI is to be changed is received from the user at step S1407, then a display of UIs that have been registered is presented at step S1408 and processing is exited. If an input to change the UI is not received, on the other hand, then processing is exited as is.

Figure 15:
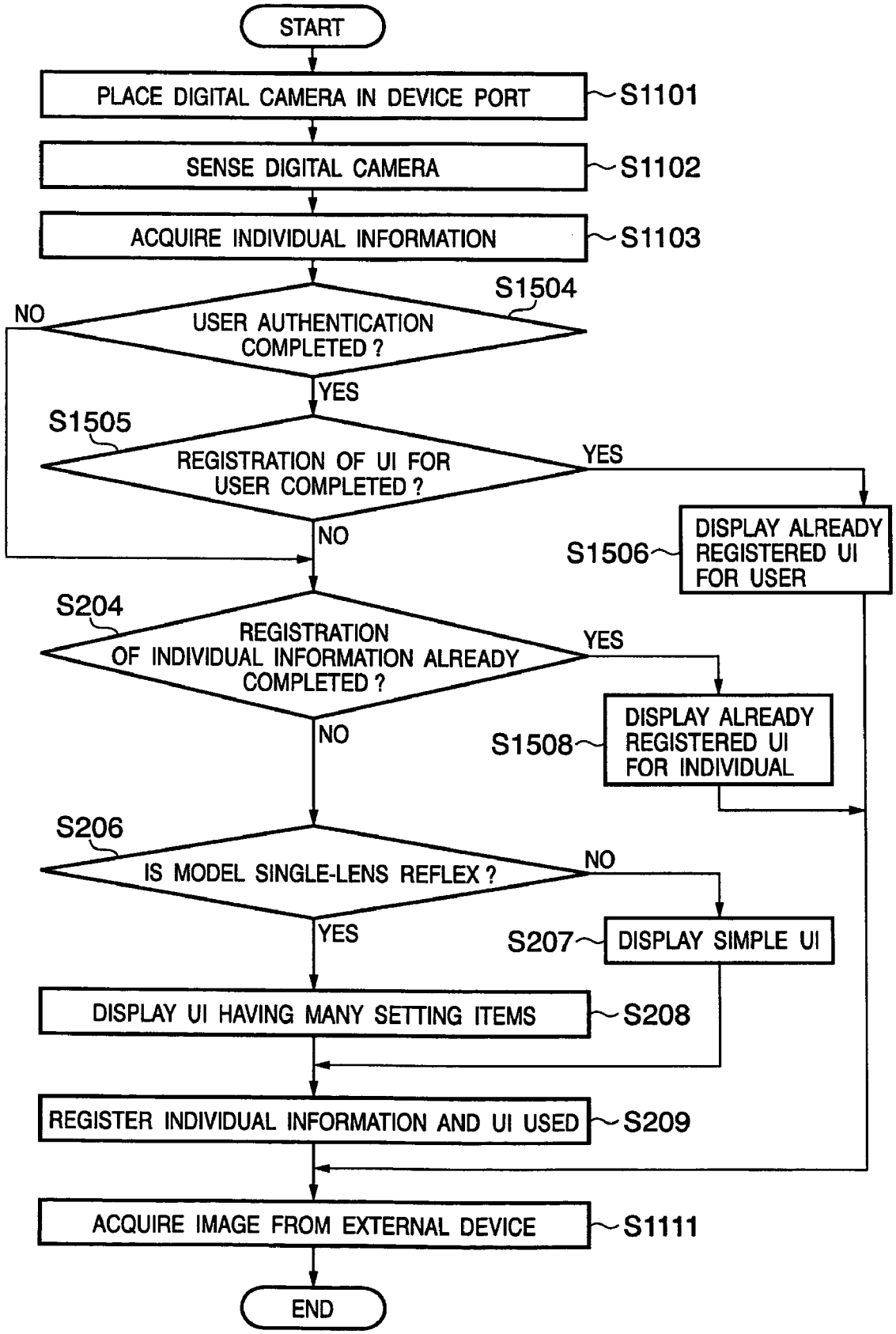
FIG. 15 is a flowchart useful in describing the flow of processing executed in an information processing apparatus according to an embodiment of the invention in a case where an external device, which combines external-device individual identification/authentication and user identification/authentication, and an image input unit are connected together.

FIG. 15 is a flowchart useful in describing processing executed in the information processing apparatus 800 for selecting a GUI screen according to the third embodiment. The processing indicated by the flowchart of FIG. 15 is executed by the CPU 101 of the information processing apparatus 800. The flow of processing up to connection of a wireless LAN, an external input/output device having a non-contact IC chip and the information processing apparatus 800 and execution of data communication will be described in accordance with the flowchart shown in FIG. 15. Steps identical with those of FIGS. 11 and 2 are designated by like step numbers and are not described again. Whether user specification/authentication has already been completed is determined at step S1504. If a "YES" decision is rendered at step S1504, control proceeds to step S1505; if a "NO" decision is rendered, then control proceeds to step S204. Whether the UI for the model of this user has been registered in the user UI management unit 1305 of UI information management unit 506 is checked at step S1505. If the UI exists, then the registered display for the above-mentioned user is displayed at step S1506. Control proceeds to step S204 in a case where it is determined at step S1504 that user specification/authentication has not been performed and also in a case where it is determined at step S1505 that the UI for the above-mentioned user has not been registered. Whether individual information has been registered in the external-device UI management unit 703 is checked at step S204. If the individual information exists, then display of the registered UI is performed at step S1508. Processing from this point onward is similar to that of the first and second embodiments.

In accordance with the third embodiment, as described above, the GUI that is optimum for the user can be displayed preferentially by an arrangement in which an external input/output device and user authentication means are combined.

Although an embodiment has been described above in detail, it is possible for the present invention to take on the form of a system, apparatus, method, program or storage medium (recording medium). More specifically, the present invention may be applied to a system constituted by a plurality of devices or to an apparatus comprising a single device.

Furthermore, there are cases where the object of the invention is attained also by supplying a software program (a program corresponding to the flowchart shown in the drawings of the foregoing embodiment), which implements the functions of the foregoing embodiment, directly or remotely to a system or apparatus, reading the supplied program codes with a computer of the system or apparatus, and then executing the program codes. In this case, so long as the system or apparatus has the functions of the program, the mode of implementation need not rely upon a program.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, e.g., object code, a program executed by an interpreter or print data supplied to an operating system, etc., does not matter.

Examples of recording media for supplying the program are a Floppy® disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiment are implemented by executing the read program by computer, an operating system or the like running on the computer may perform all or a part of the actual processing so that the functions of the foregoing embodiment can be implemented by this processing.

Furthermore, after the program read from the recording medium is written to a memory provided on a function expansion board inserted into the computer or in a function expansion unit connected to the computer, a CPU or the like mounted on the function expansion board or function expansion unit performs all or a part of the actual processing so that the functions of the foregoing embodiment can be implemented by this processing.

In accordance with the present invention, as described above, when an image that has been handled by an external input/output device is input and processed, it is possible to provide the user with an operation screen having settings with which the user is familiar, such as an operation screen that has been used in the past for this input/output device.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-033484 filed on Feb. 9, 2005 and Japanese Patent Application No. 2006-001734 filed on Jan. 6, 2006, which are hereby incorporated by reference herein in their entirety.

What is claimed is:

1. An information processing apparatus for inputting and processing an image transmitted from an external device, the information processing apparatus comprising:
   an acquisition unit configured to acquire, from the external device, indication information for indicating the external device;
   a storage unit configured to store display information for displaying an operation screen for receiving a setting for processing the image transmitted from the external device;
   a display unit configured to display the operation screen;
   a determining unit configured to determine whether or not the information processing apparatus has communicated with the external device indicated by indication information acquired by the acquisition unit in the past; and
   a control unit, configured to (a) receive, in a case where the determining unit determines that the information processing apparatus has not communicated with the external device in the past, model information representing a type of the external device indicated by indication information acquired by the acquisition unit from the external device and (b) control the display unit to display the operation screen based on the received model information and the display information stored in the storage unit,
   wherein the control unit controls, in a case where the determining unit determines that the information processing apparatus has communicated with the external device in the past, the display unit to display an operation screen corresponding to the received indication information.

2. The apparatus according to claim 1, wherein the acquisition unit acquires individual information, which indicates the individual of the external device, as the indication information.

3. The apparatus according to claim 1, further comprising a registering unit that registers, in a case where the control unit receives the model information of the external device and controls the display unit to display the operation screen based on the received model information and the display information stored in the storage unit, the indication information in association with the displayed operation screen.

4. The apparatus according to claim 3, wherein the control unit controls the display unit to display, for every type of model of external devices, a first operation screen that makes operation possible based on model information and advanced processing settings, and a second operation screen that makes operation possible based on simple processing settings.

5. The apparatus according to claim 1, wherein the image is an image that has been captured by the external device, the image being input via any one of a USB cable, network, or removable storage medium.

6. A control method for controlling an information processing apparatus for inputting and processing an image transmitted from an external device, the control method comprising:
- an acquisition step of acquiring, from the external device, indication information for indicating the external device;
- a determining step of determining whether or not the information processing apparatus has communicated with the external device indicated by the acquired indication information in the past; and
- a control step of (a) receiving from the external device, in a case where it is determined that in the determining step that the information processing apparatus has not communicated with the external device in the past, model information representing a type of the external device and (b) controlling a display unit to display the operation screen based on the received model information and the display information stored in a storage unit,
- wherein the control step controls, in a case where it is determined in the determining step that the information processing apparatus has communicated with the external device in the past, the display unit to display an operation screen corresponding to the received indication information.

7. A non-transitory computer-readable storage medium storing a program for causing a computer, which inputs and processes an image transmitted from an external device, to execute procedures comprising:
- an acquisition code to acquire, from the external device, indication information for indicating an external device;
- a determining code to determine whether or not the information processing apparatus has communicated with the external device indicated by the indication information in the past; and
- a control code to (a) receive from the external device, in a case where it is determined that the information processing apparatus has not communicated with the external device in the past, model information representing a type of the external device and (b) control a display unit to display the operation screen based on the received model information and the display information stored in a storage unit,
- wherein in a case where it is determined that the information processing apparatus has communicated with the external device in the past, an operation screen corresponding to the received indication information is displayed by the display unit.

* * * * *